United States Patent [19]
Stoakley et al.

[11] Patent Number: 4,895,972
[45] Date of Patent: Jan. 23, 1990

[54] PROCESS FOR LOWERING THE DIELECTRIC CONSTANT OF POLYIMIDES USING DIAMIC ACID ADDITIVES

[75] Inventors: Diane M. Stoakley; Anne K. St. Clair, both of Poquoson, Va.

[73] Assignee: The United States of American as represented by the Administrator of the National Aeronautics and Space Administration, Washington, D.C.

[21] Appl. No.: 239,259

[22] Filed: Sep. 1, 1988

[51] Int. Cl.$^4$ .............................................. C08G 69/26
[52] U.S. Cl. .................................... 528/353; 528/125; 528/126; 528/128; 528/172; 528/185; 528/188; 528/352
[58] Field of Search ............... 528/353, 125, 126, 128, 528/172, 185, 188, 352

[56] References Cited
PUBLICATIONS

Synthesis and Characterization of Essentially Colorless Polyimide Films, Anne K. St. Clair et al.

Primary Examiner—Morton Foelak
Assistant Examiner—M. L. Moore
Attorney, Agent, or Firm—George F. Helfrich; John R. Manning; Charles E. B. Glenn

[57] ABSTRACT

Linear aromatic polyimides with low dielectric constants are produced by adding a diamic acid additive to the polyamic acid resin formed by the condensation of an aromatic dianhydride with an aromatic diamine. The resulting modified polyimide is a better electrical insulator than state-of-the-art commercially available polyimides.

9 Claims, No Drawings

PROCESS FOR LOWERING THE DIELECTRIC CONSTANT OF POLYIMIDES USING DIAMIC ACID ADDITIVES

ORIGIN OF THE INVENTION

The invention described herein was made by employees of the United States Government and may be manufactured and used by or for the Government for governmental purposes without the payment of any royalties thereon or therefor.

This application is related to application Ser. Nos. 073,542, filed July 15, 1987 and 084,064, filed Aug. 11, 1987, which are pending U.S. patent applications.

BACKGROUND OF THE INVENTION

Linear aromatic condensation polyimides are being used increasingly as high performance film and coating materials by the electronic circuit industry. As cited by Senturia, *Proc. of ACS Polym. Matls. Sci. and Eng.*, Vol. 55, 385, (1986), polyimides are being exploited for four primary applications in the area of microelectronics: (1) as fabrication aids such as photoresists, planarization layers, and ion implant masks; (2) as passivant overcoats and interlevel insulators; (3) as adhesives; and (4) as substrate components. Of utmost importance for the performance of a polyimide used for electronic applications is its electrical behavior. To be useful, particularly as a passivant or protective overcoat, the material must be an excellent insulator.

The dielectric constants of commercially available polyimides presently used as state-of-the-art materials for passivants and interlevel dielectrics range from approximately 3.2 to 4.0 (depending on frequency and moisture content). The lower limit of 3.2 is obtained on commercial polyimide film (Kapton ® H film from E. I. DuPont de Nemours and Company) only after being fully desiccated. Unfortunately, as the film or coating absorbs moisture, the dielectric constant rises, making measurements and operation of electronic devices complicated.

The effectiveness of reducing chain-chain electronic interaction in lowering the dielectric constant of polymers was first described in the St. Clair et al patent application, "Process for Preparing Low Dielectric Polyimides", U.S. Ser. No. 073,542, filed July 15, 1987. St. Clair et al lowered the dielectric constant of polyimides by chemically altering the composition of the polymer backbone.

By the present invention, aromatic condensation polyimide films and coatings are produced which have dielectric constants that have been lowered by the incorporation of diamic acid additives. The use of low molecular weight additives has been described in the patent application of James C. Fletcher et al, "Polyimide Processing Additives", U.S. Ser. No. 084,064, filed Aug. 11, 1987. Those additives were used to decrease the melt viscosity of thermoplastic polyimides.

The incorporation of the diamic acid additives of the present invention into polyimides has provided materials that are better electrical insulators than state-of-the-art commercial polyimides. It is anticipated that these low dielectric polyimides will prove useful as film and coating materials for both industrial and aerospace applications where high electrical insulation, mechanical strength and thermal stability are required.

Accordingly, an object of the present invention is to provide a process for lowering the dielectric constant of an aromatic condensation polyimide.

Another object of the present invention is to provide a process for preparing aromatic condensation polyimide films and coatings having a dielectric constant in the range of 2.4 to 3.2.

Another object of the present invention is to provide a process for lowering the dielectric constant of an aromatic condensation polyimide by incorporation of a diamic acid.

SUMMARY OF THE INVENTION

According to the present invention, the foregoing and additional objects are attained by providing a method by which linear aromatic polyimide films and coatings are made highly electrically insulative. The process for producing highly insulative (low dielectric) aromatic polyimides according to the present invention involves the incorporation of low molecular weight diamic acid additives into a polymer as a means of reducing interactions between polymer chains.

DESCRIPTION OF THE PREFERRED EMBODIMENTS

Preparation of polyimide films and coatings involves the room temperature reaction in a solvent of an aromatic diamine with an aromatic dianhydride to yield a polyamic acid. This polymer resin is then cast as a film and thermally cured at 250°–300° C. to give a polyimide film. Examples of suitable solvents are N,N-dimethylacetamide, N,N-dimethylformamide, N-methyl-2-pyrrolidone, dimethylsulfoxide, and bis(2-methoxyethyl)ether. Examples of dianhydrides and diamines are shown in Table 1.

TABLE 1
AROMATIC DIAMINES

Oxydianiline (ODA)

Diaminobenzophenone

Diaminodiphenylmethane

Phenylenediamine

Diaminodiphenylsulfone (DDSO$_2$)

Bis(aminophenoxy)phenyl hexafluoropropane (BDAF)

TABLE 1-continued
AROMATIC DIAMINES

Pyromellitic dianhydride (PMDA)

4,4'-oxydiphthalic anhydride (ODPA)

4,4'-bis(3,4-dicarboxyphenoxy)diphenylsulfide dianhydride (BDSDA)

2,2'-bis(3,4-dicarboxyphenyl)hexafluoropropane dianhydride (6FDA)

TABLE 1-continued
AROMATIC DIAMINES 1,4-bis(3,4-dicarboxyphenoxy)benzene dianhydride 3,3',4,4'-benzophenone tetracarboxylic dianhydride (BTDA)

3,4,3',4'-biphenyl tetracarboxylic dianhydride

In the present invention the incorporation of certain diamic acid additives was found to provide a means of reducing dielectric constants in low dielectric aromatic condensation polyimides. Examples of additives used in the present invention are shown in Table 2.

TABLE 2
DIAMIC ACID ADDITIVES 2,2-bis(3,4-dicarboxyphenyl)hexafluoropropane dianhydride-aniline diamic acid (6FDA—An)

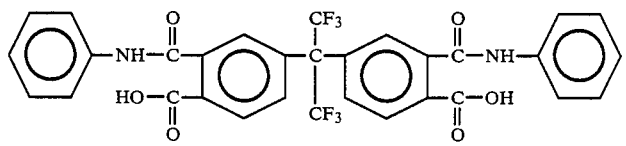

3,3'-diaminodiphenylsulfone-phthalic anhydride diamic acid (3,3'-DDSO$_2$—PA)

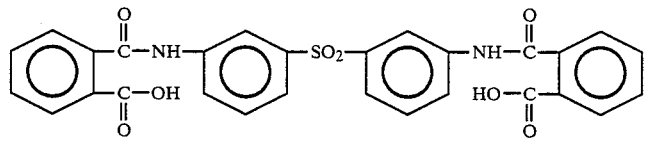

4,4'-oxydiphthalic anhydride-aniline diamic acid (ODPA—An)

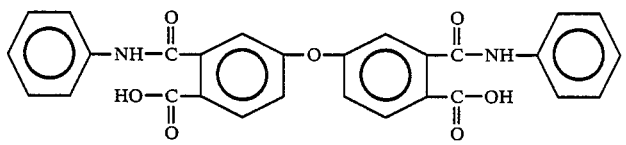

2,2-bis[4(4-aminophenoxy)phenyl]hexafluoropropane-phthalic anhydride diamic acid (4-BDAF—PA)

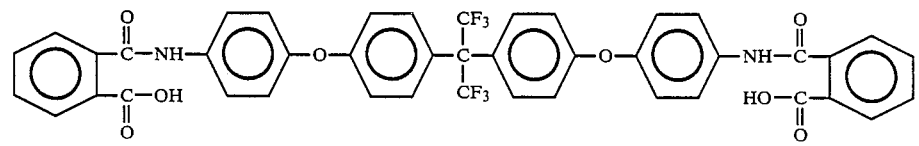

2,2-bis[4(3-aminophenoxy)phenyl]hexafluoropropane-phthalic anhydride diamic acid (3-BDAF—PA)

TABLE 2-continued
DIAMIC ACID ADDITIVES

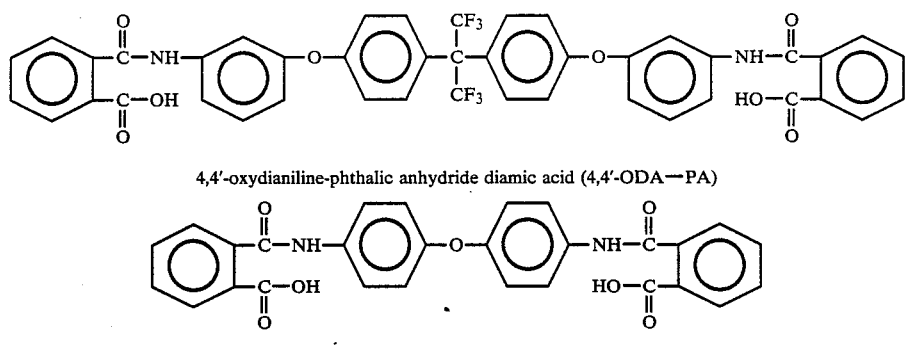

4,4'-oxydianiline-phthalic anhydride diamic acid (4,4'-ODA—PA)

These additives were prepared by reacting polymer grade anhydrides and amines in solvents such as 1-methyl-2-pyrolidinone (NMP), N,N-dimethylacetamide (DMAc), N,N-dimethylformamide (DMF) and 2-methoxyethyl ether (diglyme) or their mixtures at ambient temperature. The resulting solutions were precipitated in water or toluene to generate powders which were dried at ambient temperature in vacuo to constant weight. Examples of the synthesis of the two types of additives claimed in this patent are shown below.

EXAMPLES

EXAMPLE 1

Preparation of the 3,3',4,4'-Oxydiphthalic Anhydride-Aniline Diamic Acid Additive (ODPA-An): 4,4'-Oxydiphthalic anhydride (ODPA) (62.5 g, 0.201 mol) and aniline (37.5 g, 0.403 mol) were reacted in 75 ml each of diglyme and NMP for two hours. The bis(amic acid) produced was precipitated in water in a blender and air dried. The powder had a melt onset temperature of 125° C. by differential thermal analysis (DTA). Recrystallization of a sample of this additive from acetone-water gave large crystals of product, m.p. 292°–94° C.

EXAMPLE 2

Preparation of the 2,2-Bis[4(4-aminophenoxy)phenyl] hexafluoropropane-Phthalic Anhydride Diamic Acid Additive (4-BDAF-PA): To a solution of phthalic anhydride (5.9 g, 0.040 mol) in 12 ml each of NMP and diglyme at ambient temperature was added recrystallized 2,2-bis[4(4-aminophenoxy)phenyl] hexafluoropropane (4-BDAF) (10.4 g, 0.020 mol). The resulting solution was stirred at ambient temperature for several hours before it was precipitated from water in a blender. After washing three times with water the product was dried in vacuo at ambient temperature for three days. The broad onset m.p. by DTA was 115° C.

Other diamic acid additives were prepared by reacting the amine and/or anhydride monomer(s) with the endcap as shown below:

| Monomer Reactant | Endcap |
|---|---|
| 6FDA | Aniline (1:2) |
| 4,4'-ODA | Phthalic Anhydride (1:2) |
| 3,3'-DDSO$_2$ | Phthalic Anhydride (1:2) |
| 3-BDAF | Phthalic Anhydride (1:2) |

An effective lowering in dielectric constant by use of diamic acid additives as taught in the present invention is achieved only with specific compositions. The extent of the reduction in dielectric constant varies with the amount of additive used.

The low dielectric films and coatings of the present invention involve the incorporation of low molecular weight amic acid additives in the polyamic acid resin before thermal imidization of the film.

Although the examples which illustrate this invention used diamic acid additives in the range of 3–15 percent by weight, the invention is not limited to this range; selected additives at lower and higher concentrations should also be useful with good results expected between one and twenty percent by weight.

The following specific examples provide the details of polyimide film formation with and without diamic acid additives, results of which are summarized in Tables 3 and 4.

EXAMPLE 3

To a 300 ml flask flushed with nitrogen was added 12.96 g of 2,2-bis[4(4-aminophenoxy)phenyl]hexafluoropropane (4-BDAF) that had been recrystallized from methylene chloride, and 145.75 g dry dimethylacetamide (DMAc). After the diamine had dissolved, 12.76 g of 4,4'-bis(3,4-dicarboxyphenoxy)diphenyl sulfide dianhydride (BDSDA) (dried for 14 hours at 120° C.) was added at once and stirring was continued overnight. The inherent viscosity of the resulting polymer was determined to be 0.87 dl/g at 35° C. The resulting polyamic acid solution (15 percent solids by weight) was refrigerated until used for film casting.

A film of BDSDA/4casting BDAF polyamic acid was prepared by casting the resin onto a soda-lime glass plate in a dust-free chamber at a relative humidity of 10 percent. The solution was spread by an aluminum blade with the gap set so as to ensure a final film thickness of 1.0 mil. The polyamic acid film was thermally converted to the corresponding polyimide by successive one hour heatings in a forced air oven at 100°, 200° C., and 300° C. The resulting film was removed from the glass plate after cooling to room temperature by immersion in warm water. The dielectric constant of this film measured under ambient conditions was 2.84 at 10 GHz.

EXAMPLE 4

To 10.69 g of the BDSDA/4-BDAF polyamic acid resin of Example 3 was added 0.160 g (10 percent by weight based on resin solids) of 2,2-bis(3,4-dicarboxyphenyl)hexafluoropropane dianhydride-aniline diamic acid additive (6FDA-An). A film was prepared using the same method as described in Example 3. The dielectric constant of this film was determined to be 2.80, slightly lower than the 2.84 dielectric constant of the BDSDA/4-BDAF base polyimide of Example 3.

EXAMPLE 5

The process of Example 4 was repeated using 0.240 g (15 percent by weight) 6FDA-An. The dielectric constant of the resulting film was 2.73, substantially lower than that of the base polymer.

EXAMPLE 6

The process of Example 4 was repeated using 0.160 g (10 percent by weight) of 3,3'-diaminodiphenylsulfone-phthalic anhydride diamic acid additive (3,3'-DDSO$_2$-PA) This film had a dielectric constant of 2.71, significantly lower than that of BDSDA/4-BDAF.

EXAMPLE 7

The process of Example 4 was repeated using 0.080 g (5 percent by weight) of 4,4'-oxydiphthalic anhydride-aniline diamic acid additive (ODPA-An). The dielectric constant of this film was measured to be 2.65 at 10 GHz, compared to 2.84 for BDSDA/4-BDAF without the additive.

EXAMPLE 8

The process of Example 4 was repeated using 0.080 g (5 percent by weight) of 4-BDAF-PA additive, yielding a film with a dielectric constant of 2.61 at 10 GHz, markedly lower than the BDSDA/4-BDAF base polymer.

EXAMPLE 9

The process of Example 4 was repeated using 0.160 g (10 percent by weight) of 4-BDAF-PA. The resulting film had a dielectric constant of 2.59, much lower than the 2.84 dielectric constant of the base polymer.

EXAMPLE 10

The process of Example 4 was repeated using 0.080 g (5 percent by weight) of 2,2-bis[(3-aminophenoxy)phenyl] hexafluoropropane-phthalic anhydride (3-BDAF-PA) to yield a polyimide film with a dielectric constant of 2.71, lower than that of the BDSDA/4-BDAF base polymer (2.84 at 10 GHz).

EXAMPLE 11

To a reaction flask was added 64.19 g 4-BDAF that had been recrystallized from ethanol, and 675.40 g dry DMAc. This was stirred at room temperature under nitrogen. After the diamine had dissolved, 55.00 g of 6FDA, recrystallized from toluene and acetic anhydride, was added and stirring was continued overnight. The inherent viscosity of the resulting polymer was 1.06 dl/g at 35° C. This polyamic acid solution (15 percent solids by weight) was refrigerated until used for film casting.

A film of 6FDA/4-BDAF polyamic acid was prepared by casting the resin onto a soda-lime glass plate in a dust-free chamber at a relative humidity of 10 percent. The solution was spread by an aluminum blade with a gap set to ensure a final film thickness of 1.0 mil. The polyamic acid film was thermally converted to the corresponding polyimide by successive one hour heatings in a forced air oven at 100° C., 200° C., and 300° C. The resulting film was removed from the glass plate after cooling to room temperature by immersion in warm water. The dielectric constant of this polyimide film was 2.53 at 10 GHz.

EXAMPLE 12

To 10.69 g of the 6FDA/4-BDAF polyamic acid resin of Example 11 was added 0.160 g (10 percent by weight based on resin solids) of 6FDA-An. A film was prepared using the same method as described in Example 11. The dielectric constant of this film was measured to be 2.43, substantially lower than that of the base polymer.

EXAMPLE 13

The process of Example 12 was repeated using 0.080 g (5 percent by weight) ODPA-An. The dielectric constant of the resulting film was determined to be 2.48, slightly lower than the 2.53 dielectric constant of the 6FDA/4-BDAF base polyimide of Example 11.

EXAMPLE 14

The process of Example 12 was repeated using 0.080 g (5 percent by weight) 4-BDAF-PA additive. The dielectric constant of the polyimide film of this polymer was 2.48, slightly lower than the 6FDA/4-BDAF base polymer.

EXAMPLE 15

The process of Example 12 was repeated using 0.160 g (10 percent by weight) of 4,4'-oxydianiline-phthalic anhydride (4,4'-ODA-PA). The dielectric constant of the resulting film was measured to be 2.45 at 10 GHz, lower than the 2.53 of the 6FDA/4-DBAF base polymer.

EXAMPLE 16

To a reaction vessel was added 2.002 g sublimed 4,4'-oxydianiline (4,4'-ODA) and 23.704 g dry DMAc. This was stirred at room temperature under nitrogen. After the diamine had dissolved, 2.181 g sublimed pyromellitic dianhydride (PMDA) was added and stirring was continued for five hours. This solution (15 percent solids by weight) was refrigerated until use.

A film of PMDA/4,4'-ODA was prepared by casting the resin onto a soda-lime glass plate in a dust-free chamber at a relative humidity of 10 percent. The solution was spread by an aluminum blade with a gap set to ensure a final film thickness of 1.0 mil. This polyamic acid film was thermally converted to the corresponding polyimide by successive one hour heatings in a forced air oven at 100° C., 200° C. and 300° C. The resulting film was removed from the glass plate after cooling to room temperature by immersion in warm water. The dielectric constant of this polyimide film was 3.13 at 10 GHz.

EXAMPLE 17

To 5.345 g of the PMDA/4,4'-ODA polyamic acid resin of Example 16 was added 0.080 g (10 percent by weight based on resin solids) 4-BDAF-PA diamic acid additive. A film was prepared using the method of Example 16. The dielectric constant of this film was determined to be 3.09, slightly lower than the 3.13 dielectric constant of the PMDA/4,4'-ODA base polyimide of Example 16.

EXAMPLE 18

The process of Example 16 was repeated using 0.080 g (10 percent by weight) of 6FDA-An diamic acid additive. The dielectric constant of the resulting film was 3.02, substantially lower than that of the base polymer.

Tables 3 and 4 summarize the results of diamic acid additives as applied to base polymers: BDSDA/4-BDAF and 6FDA/4-BDAF, respectively.

TABLE 3

DIELECTRIC CONSTANTS OF BDSDA/4-BDAF POLYMERS CONTAINING DIAMIC ACID ADDITIVES

| Additive | Additive Concentration Wt % | Dielectric Constant at 10 GHz |
|---|---|---|
| BDSDA/4-BDAF Base Polymer (no additive) | — | 2.84 |
| 6FDA-An | 3 | 2.86 |
| | 5 | 2.85 |
| | 10 | 2.80 |
| | 15 | 2.73 |
| 3,3'-DDSO$_2$—PA | 3 | 2.84 |
| | 5 | 2.84 |
| | 10 | 2.71 |
| ODPA-An | 5 | 2.65 |
| 4-BDAF-PA | 5 | 2.61 |
| | 10 | 2.59 |
| 3-BDAF-PA | 5 | 2.71 |

For example, it is evident in Table 3 that not all of the diamic acid additives were equally effective in lowering the 2.84 dielectric constant of the BDSDA/4-BDAF base polymer. Some of the additives (6FDA-An and 3,3'-DDSO$_2$-PA) appeared beneficial in lowering the dielectric constant only when used at the higher 10-15 percent by weight concentration level. Others, such as ODPA-An and 4-BDAF-An, effectively reduced the dielectric constant of the BDSDA/4-BDAF polymer system when used at the 5 percent by weight level.

TABLE 4

DIELECTRIC CONSTANTS OF 6FDA/4-BDAF POLYMERS CONTAINING DIAMIC ACID ADDITIVES

| Additive | Additive Concentration Wt % | Dielectric Constant at 10 GHz |
|---|---|---|
| 6FDA/4-BDAF Base Polymer (no additive) | — | 2.53 |
| 6FDA-An | 3 | 2.56 |
| | 5 | 2.56 |
| | 10 | 2.43 |
| 3,3'-DDSO$_2$—PA | 3 | 2.50 |
| | 5 | 2.49 |
| | 10 | 2.56 |
| ODPA-An | 5 | 2.48 |
| 4-BDAF-PA | 5 | 2.48 |
| 3-BDAF-PA | 5 | 2.56 |
| 4,4'-ODA-PA | 10 | 2.45 |

Table 4 shows that the 6FDA/4-BDAF polymer has a lower dielectric constant than BDSDA/4-BDAF (2.53 compared to 2.84). As summarized in Table 4, the 6FDA-An additive was successful in lowering the dielectric constant of 6FDA/4-BDAF from 2.53 to 2.43. Other additives, though not as effective, which lowered the dielectric constant include ODPA-An, 4-BDAF-PA, and 4,4'-ODA-PA.

Although data in Tables 3 and 4 illustrate the use of amic acid additives to further lower the dielectric constant of low dielectric aromatic polyimide systems, this method can also be used to reduce the dielectric constant of polyimide systems with relatively high dielectric constants. The base resins of Tables 3 and 4 have dielectric constants that are considerably lower than a standard polyimide such as Kapton ® H film from E. I. DuPont de Nemours and Company (3.2-4.0). When the amic acid additives of the present invention were added to a conventional polyimide, PMDA/4,4'-ODA, the dielectric constant of 3.13 was reduced. With the addition of 10 percent by weight 4-BDAF-PA, the dielectric constant was lowered to 3.09, while the addition of 10 percent by weight 6FDA-An resulted in a dielectric constant of 3.02. Thus, the method of this invention is applicable to linear aromatic polyimides in general.

What is claimed as new and desired to be secured by Letters Patent of the United States is:

1. A method for producing high temperature linear aromatic polyimide films and coatings having low dielectric constants comprising:
    forming a polyamic acid solution by chemically reacting equimolar quantities of an aromatic diamine and an aromatic dianhydride in a solvent medium;
    adding a diamic acid additive to the polyamic acid solution so that the concentration of the diamic acid additive is about 1-20 percent by weight based on the percent solids in the polyamic acid resin, the diamic acid additive being selected from the group consisting of:
    2,2-bis(3,4-dicarboxyphenyl)hexafluoropropane dianhydride-aniline diamic acid;
    3,3,'-diaminodiphenylsulfone-phthalic anhydride diamic acid;
    4,4,'-oxydiphthalic anhydride-aniline diamic acid;
    2,2-bis[4(4-aminophenoxy)phenyl]hexafluoropropane-phthalic anhydride diamic acid;
    2,2-bis[4(3-aminophenoxy)phenyl]hexafluoropropane-phthalic anhydride diamic acid; and
    4,4'-oxydianiline-phthalic anhydride diamic acid;
    applying onto a surface a desired thickness film layer of the polyamic acid solution containing the diamic acid additive; and
    thermally curing the applied film in the temperature range of 250° C. to 300° C. for at least one hour to yield a low dielectric polyimide film layer.

2. The method of claim 1 wherein the aromatic diamine is selected from the group of diamines consisting of:
    3,3'-, 3,4'-, or 4,4'-oxydianiline;
    3,3'-, 3,4'-, or 4,4'-diaminobenzophenone;
    3,3'-, 3,4'-, or 4,4'-diaminodiphenylmethane; meta- or, para-phenylenediamine;
    3,3'-, 3,4'-, or 4,4'-diaminodiphenylsulfone;
    2,2-bis[4(4-aminophenoxy)phenyl]hexafluoropropane;
    2,2-bis[4(3-aminophenoxy)phenyl]hexafluoropropane.

3. The method of claim 1 wherein the dianhydride is selected from the group of aromatic dianhydrides consisting
    pyromellitic dianhydride;
    2,2-bis(3,4-dicarboxyphenyl)hexafluoropropane dianhydride;
    4,4'-bis(3,4-dicarboxyphenoxy)diphenylsulfide dianhydride;
    4,4'-oxydiphthalic anhydride;
    1,4-bis(3,4-dicarboxyphenoxy)benzene dianhydride;
    3,3',4,4'-benzophenone tetracarboxylic dianhydride;
    and 3,4,3',4'-biphenyltetracarboxylic dianhydride.

4. The method of claim 1 wherein the solvent is selected from the group consisting of:

N,N-dimethylacetamide,
N,N-dimethylformamide,
N-methyl-2-pyrrolidone,
dimethylsulfoxide, and
bis(2-methoxyethyl)ether.

5. The method of claim 1 wherein the concentration of diamic acid additive is 3–15 percent by weight based on the percent solids in the polyamic acid resin.

6. The method of claim 1 wherein the diamine is selected from the group of diamines consisting of:
   4,4'-oxydianiline; and
   2,2-bis[4(4-aminophenoxy)phenyl]hexafluoropropane.

7. The method of claim 1 wherein the dianhydride is selected from the group of aromatic dianhydrides consisting of:
   pyromellitic dianhydride;
   2,2-bis(3,4-dicarboxyphenyl)hexafluoropropane dianhydride;
   4,4'-bis(3,4-dicarboxyphenoxy)diphenylsulfide dianhydride.

8. The method of claim 1 wherein the polyamic acid resin is selected from the group consisting of:
   4,4'-bis(3,4-dicarboxyphenoxy)diphenyl sulfide dianhydride/2,2-bis[4(4-aminophenoxy)phenyl]hexafluoropropane; and
   2,2-bis(3,4-dicarboxyphenyl)hexafluoropropane dianhydride/2,2-bis[4(4-aminophenoxy)phenyl]hexafluoropropane; and
   pyromellitic dianhydride/4,4'-oxydianiline.

9. The method of claim 1 wherein the solvent is N,N-dimethylacetamide.

* * * * *